Figure 1:
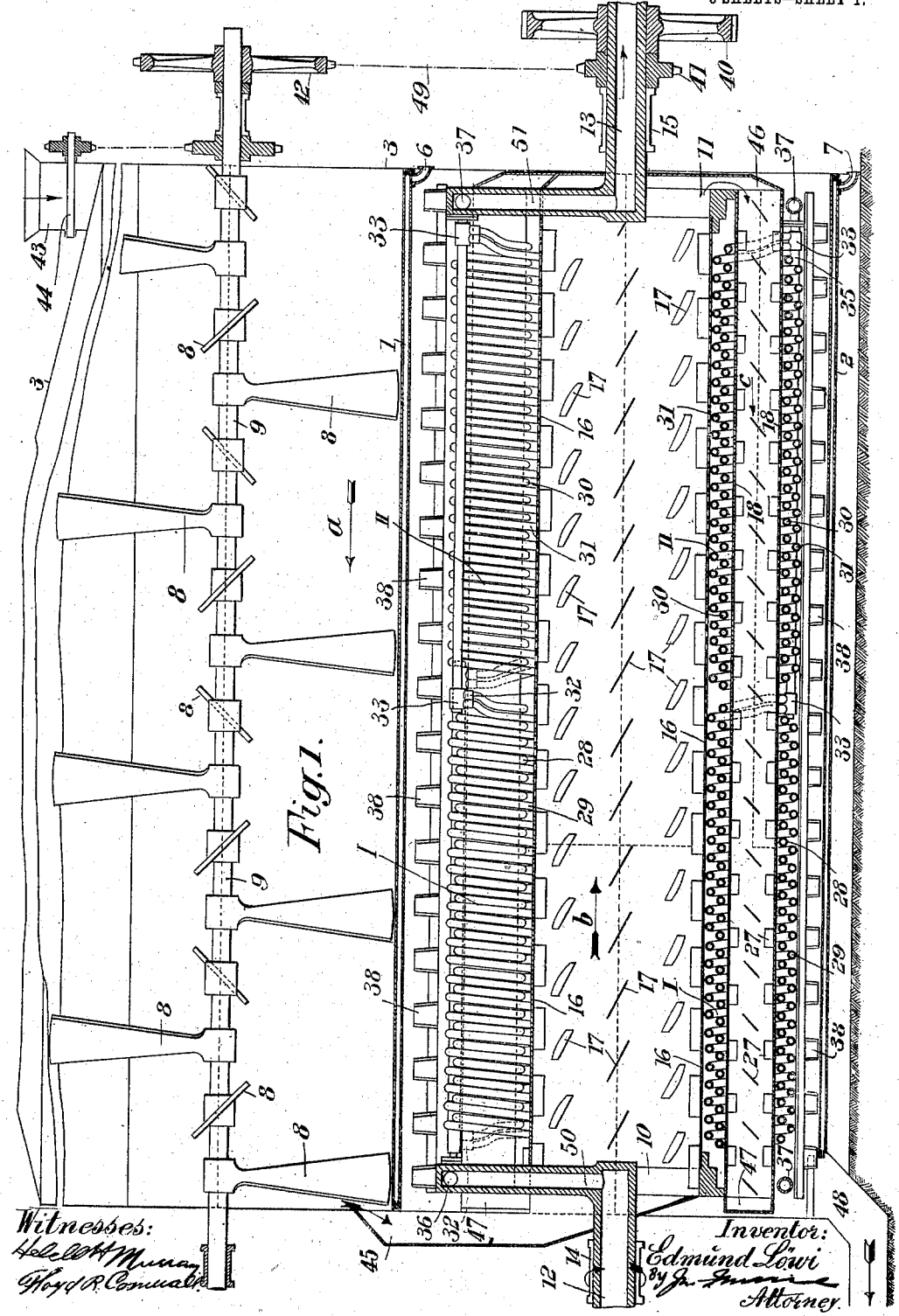

E. LÖWI.
DRYING APPARATUS.
APPLICATION FILED JAN. 3, 1910.

967,027.

Patented Aug. 9, 1910.

3 SHEETS—SHEET 1.

Witnesses:

Inventor:
Edmund Löwi
By
Attorney

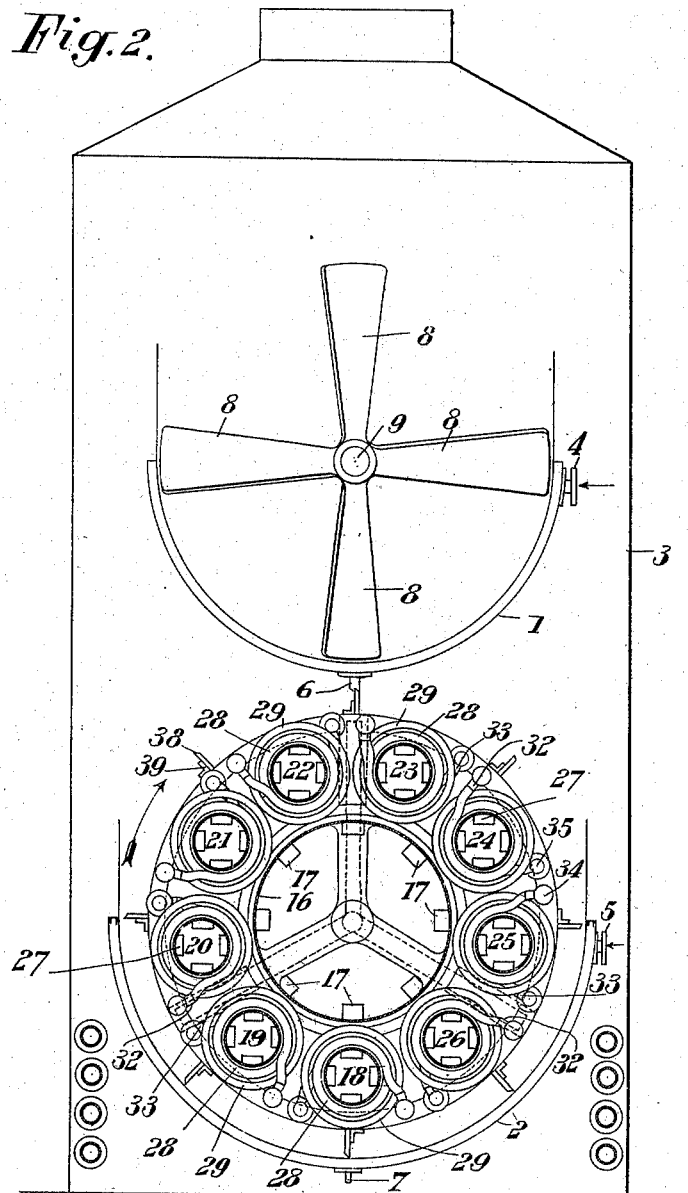

E. LÖWI.
DRYING APPARATUS.
APPLICATION FILED JAN. 3, 1910.
967,027.
Patented Aug. 9, 1910.
3 SHEETS—SHEET 3.
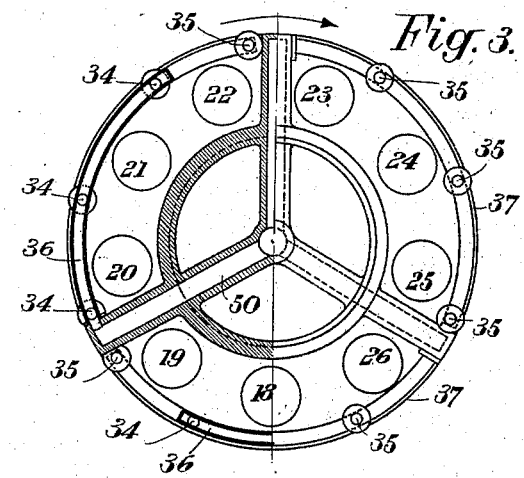
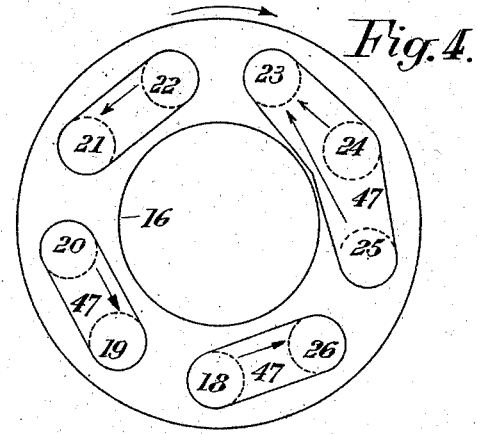
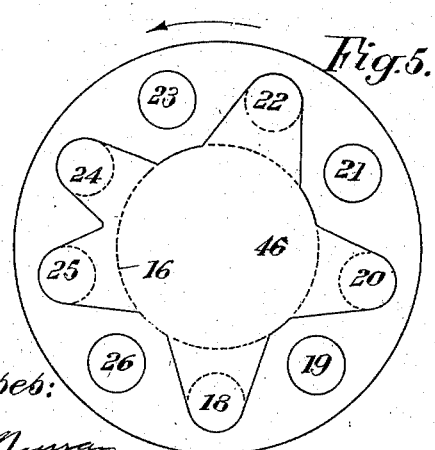
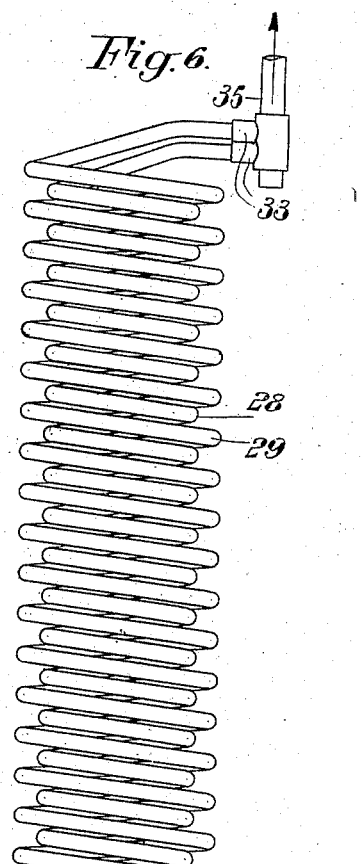
Witnesses:
Inventor:
Edmund Löwi
Attorney.

UNITED STATES PATENT OFFICE.

EDMUND LÖWI, OF VIENNA, AUSTRIA-HUNGARY.

DRYING APPARATUS.

967,027. Specification of Letters Patent. Patented Aug. 9, 1910.

Application filed January 3, 1910. Serial No. 536,140.

*To all whom it may concern:*

Be it known that I, EDMUND LÖWI, a subject of the Austrian Emperor, and resident of Vienna, Austria-Hungary, have invented certain new and useful Improvements in Drying Apparatus, of which the following is a specification.

This invention relates to a combined trough and drum drying apparatus, there being but one trough and one drum, through which the material to be dried is forced to travel.

Another object of the invention is to provide an apparatus comprising means whereby an increased heating surface is obtained, to thoroughly dry the material in its passage through the machine.

In the accompanying drawings: Figure 1 shows a longitudinal section of a drying apparatus constructed according to the principles of the present invention. Fig. 2 is a cross section of same; Figs. 3, 4, and 5, are end views of the drying drum, illustrating the manner in which the material to be dried is conveyed from the main drum into the secondary drums and distributed therein; Fig. 6 is a side elevation of a coil containing the steam duct and the condensed water duct.

The drying apparatus comprises two semicircular double walled troughs 1 and 2 supported in the casing 3 of the apparatus. These troughs are heated by means of steam which enters respectively at 4 and 5 and escapes at 6 and 7. A shaft 9 is arranged in the trough 1 and carries stirring and conveying blades 8, which during their rotation stir the material to be dried and convey it along the said trough. In this trough 1 the material is preliminarily dried, and is kept in an agitated condition by the blades.

Arranged in the trough 2 is the drying drum proper. The latter comprises a main drum and a series of secondary drums. The drying drum is formed with hollow heads 10 and 11 steam entering thereto through ducts 50, and escaping therefrom through ducts 51. The ducts 50 and 51 communicating with the hollow trunnions 12 and 13 respectively, the said trunnions being journaled in bearings 14 and 15.

The main drum 16 is arranged between the heads 10 and 11, and is provided on its inner circumferential surface with conveying or stirring blades 17. Supported around the said main drum is a series of secondary drums 18, 19, 20, 21, 22, 23, 24, 25, and 26. Each secondary drum is provided on its inner surface with stirring and conveying blades 27, arranged and positioned in such manner that in some of the drums the material is conveyed in one direction, and in the remaining drums in the opposite direction.

Each secondary drum is surrounded by two or more coils of pipes 28, 29, 30, 31 (in the present instance two sections I and II being provided) each of the coils having a special steam admission end 32, and a water escape end 33. Each coil may in turn be composed of several coils, in the example shown in the drawings two coils of pipes 28, 29 and 30, 31 being illustrated. The steam admission end 32 is connected with a steam admission pipe 34 which is common to each section and which is connected to the ducts 50, by pipes 36. The water escape end 33 is connected with a water escape pipe 35, communicating with the ducts 51, by pipes 37. Owing to this arrangement, and to the fact that the drums are rotated, each coil of pipe always receives a supply of live steam, and the water due to condensation is automatically carried off.

Owing to the fact that the various coils are connected at the steam admission end, and the water escape end with the ducts 50 and 51 on one side directly, and on the other side indirectly by means of a straight admission duct passing over the other section or sections, the expansion of the various coils can take place in an absolutely free manner, thereby preventing leaks.

The course of the steam is as follows: The steam is introduced into the hollow trunnion 12, and passes through the ducts 50, and pipes 36, through the pipes 34 and then through connections 32 and into the various coils. The steam passes through the coils and with the water of condensation passes through the water escape ends 33, into the pipes 35 to and through the pipes 37, and thence through the ducts 51, to the trunnion 13, and escapes into the atmosphere or into a condenser.

A frame surrounds the secondary drums, and carries angle irons 39, on which are a series of stirring or conveying blades 38. These blades stir the material and convey it along the trough 2, to the exit chute 48. The main drum is driven by a toothed wheel 40, which is rotated by a driving motor through the instrumentality of a suitable intermediate gearing. A sprocket wheel 41, chain 49, and the sprocket wheel 42, transmit motion from the trunnion 13 to the shaft 9 of the stirring device in the trough 1.

In operation, the material to be dried is introduced into the trough 1, through the chute 43. The material passing through the chute is continuously stirred by a stirring device 44, operated by a chain engaging a sprocket wheel on the shaft 9. The material in the trough 1 is admitted by the stirring and conveying blades 8, in the direction of the arrow *a*. It is thus subjected at the same time to a preliminary desiccation. From the trough 1 the material is conveyed through a passage 45, into the main drum 16, where it is stirred by the action of the blades 17, and caused to advance in the direction of the arrow *b*. When the material reaches the end of the drum 16 it falls into one of a series of pockets 46, which communicate respectively with the secondary drums 18, 20, 22, 24, and 25, and when any one of the latter reaches its lowermost position a part of the material will pass into the said drums. The blades 27 in these drums will convey the material in the direction of the arrow *c*, that is to say, in a direction opposite to that which the material followed in passing through the main drum. When the material reaches the opposite ends of the secondary drums 18, 20, 22, 24, and 25, it passes into chambers 47, and is directed thereby into the other secondary drums 19, 21, 23, and 26. The material while being dried is conveyed by the chambers 47, from the secondary drum 18, into the secondary drum 26; from the drums 20, into the drum 19; from drum 22 into drum 21, and from the drums 24 and 25 into the drum 23. In these drums 26, 19, 21 and 23 the blades cause the material to move in a direction opposite to that in which it moves in the drums 18, 20, 22, 24, and 25. From the drums 19, 21, 23, and 26 the dried material falls into the trough 2, from which it is conveyed by the blades 38, to the exit chamber 48 where it leaves the apparatus in a completely and uniformly dried condition.

In order to prevent the completely dried material escaping from the apparatus, being subjected to the vapors from the moist material being dried, the envelops of the main and secondary drums are imperforate for about one third their length on the end adjacent the exit flue 48, while the remainder of the envelops are perforated. The perforations in the main drum extend entirely around the surface, while the perforations in the secondary drums are only located in that part of the surface which is turned away from the main drum, whereby the contact between the vapor escaping through the perforated portion of the main drum, and the half dried material in the secondary drums is avoided.

If necessary the apparatus can be constructed in such manner that the material to be dried is conveyed to and fro several times in the secondary drums, whereby the path the material travels in being dried is considerably increased.

Having now fully described my said invention, what I claim and desire to secure by Letters Patent, is:

1. In a drying apparatus of the kind described, the combination with a framework, of a trough, means for heating the trough, a main revolving drying drum positioned in said trough, means for supporting the said drum, conveying means in said drum, a plurality of secondary drying drums, means for causing the material to be dried to pass through said secondary drying drums and means for heating said drying drums, substantially as and for the purpose set forth.

2. In a drying apparatus of the kind described the combination with a framework, of a double walled trough, means for introducing steam between the walls of said trough, a main drying drum, means for rotatably supporting the said main drying drum in said trough, a plurality of secondary drying drums arranged in parallel rotation around the periphery of said main drum, means for connecting said main and certain of said secondary drums together, means provided in said drums to cause the material to be dried to travel therethrough, and means for heating said drums, substantially as and for the purpose set forth.

3. In a drying apparatus of the kind described the combination with a framework, of a double walled trough, means for heating said trough, a rotary main drying drum provided in said trough, a plurality of parallel secondary drying drums carried by the periphery of said main drying drum, a heating coil surrounding each of said secondary drying drums, said heating pipe being divided into a plurality of sections, means for conveying steam to each of said sections and for removing therefrom the water of condensation, means for rotating said drum, and means for causing the material to be dried to move through said drums and trough, substantially as and for the purpose set forth.

4. In a drying apparatus of the kind described the combination with a framework, of a heated trough, a rotary drying drum provided in said trough, a plurality of parallel secondary drying drums carried on the periphery of said main drying drum, a plurality of heating coils surrounding each of said secondary drying drums and divided into a plurality of sections, means for conveying steam into each of said sections of the coils, means for removing therefrom the water of condensation, means for rotating said main drum, and means for causing the material to be dried to move through said drums and trough, substantially as and for the purpose set forth.

5. In a drying apparatus of the kind described, the combination with a framework, of a heated trough, a rotary drying drum having terminal heads provided in said trough, hollow trunnions on said heads, bearings for said hollow trunnions, a plurality of hollow radial ducts provided on said heads and connected with said hollow trunnions, a plurality of secondary drying drums arranged in parallel relation and supported on the periphery of said main drum, heating coils surrounding each of said secondary drying drums, each of said coils being divided into sections, each of said sections being provided with connections to form a steam inlet and a water outlet, one of said connections being directly connected with the corresponding drum head and the radial arms thereof, and the other said connection being connected with the other head, means for rotating said main drum, and means for causing the material to be dried to move through said drums and trough, substantially as and for the purpose set forth.

6. In a drying apparatus of the kind described, the combination with a framework, of a heated trough, a rotary main drum, supported in said trough, a plurality of secondary drying drums arranged in parallel relation and supported by said main drum, means for introducing the material to be dried in the apparatus, means for ejecting it therefrom, said drums being in part perforated and in part imperforate, means for rotating said main drum, and means for causing the material to be dried to move through the said drums and trough, substantially as and for the purpose set forth.

7. In a drying apparatus, the combination with a casing, an upper trough in the casing, a lower trough in the casing, stirrers in the upper trough, a revolving main drum in the lower trough, a chute communicating with the upper trough and the main drum, a plurality of secondary drums revolving with the main drum, certain of said secondary drums communicating with the main drum, a connection between the secondary drums which communicate with the main drum and the remaining secondary drums, the said remaining secondary drums communicating with the lower trough, means for heating the drums.

8. In a drying machine, the combination with a casing, a trough in the casing, a revolving main drum mounted in the casing, means in the drum for feeding material toward one end thereof, a plurality of secondary drums revolving with certain of them communicating with the main drum, means in the secondary drums to feed the material in the opposite direction to its travel in the main drum, means for conveying the material from the secondary drums, and means for heating the drums.

9. In a drying machine, the combination with a casing, a trough in the casing, said trough being hollow to form a heating chamber, a revolving main drum in the trough, blades therein to feed the material toward one end of the main drum, a plurality of secondary drums surrounding the main drum, certain of said secondary drums communicating with the main drum, the remainder of the said secondary drums connecting with those which communicate with main drum, the said remainder of the secondary drums communicating with the trough, coils of pipe surrounding each secondary drum, means for supplying each coil of pipe with a heating medium, and means revolving with the main drum for conveying the dried material from the trough.

10. In a drying apparatus, the combination of a casing, a trough therein and means for heating the trough, a main revolving drum mounted in the casing, a plurality of secondary drums revolving with the main drum, a coil of pipe encircling each secondary drum, blades in the secondary drums for conveying the material from one end of the drums to the other, means for directing the material into certain of the secondary drums, from the main drum, means for conveying the material between certain of the secondary drums, and means for conveying the material from the secondary drums and the trough.

In testimony whereof I have hereunto set my hand in presence of two witnesses.

EDMUND LÖWI.

Witnesses:
CHAS. G. LASLEY,
AUGUST FUGGER.